United States Patent
Hardy et al.

[15] 3,689,611
[45] Sept. 5, 1972

[54] METHOD OF MAKING GLAZED CERAMIC BONDED EXPANDED VERMICULITE ARTICLES

[72] Inventors: Paul Wilson Hardy, Barrington; Orrin Martel Peterson, Crystal Lake, both of Ill.

[73] Assignee: American Can Company, Greenwich, Conn.

[22] Filed: Aug. 6, 1970

[21] Appl. No.: 61,831

Related U.S. Application Data

[63] Continuation of Ser. No. 706,741, Jan. 31, 1968, abandoned, which is a continuation-in-part of Ser. No. 578,064, Sept. 8, 1966, abandoned.

[52] U.S. Cl. .................. 264/43, 106/40, 106/41, 264/44, 264/56, 264/59, 264/62
[51] Int. Cl.....C04b 21/08, C04b 31/26, C04b 33/34
[58] Field of Search ........106/45, 39, 40; 264/43, 56, 264/63, 62, 59

[56] References Cited

UNITED STATES PATENTS

| | | |
|---|---|---|
| 2,079,665 | 5/1937 | Seigle..........................264/43 |
| 2,741,008 | 4/1956 | Snoddy........................106/45 |
| 2,839,209 | 6/1958 | Lester et al...................106/45 |
| 3,274,310 | 9/1966 | Kohl............................264/43 |
| 3,425,577 | 2/1969 | Copley.........................106/40 |
| 2,079,664 | 5/1937 | Seigle..................264/DIG. 57 |

OTHER PUBLICATIONS

R. L. Green, " Technical Developments In Dinnerware," Ceramic Bulletin, Feb., 1966 at 210
N. F. Mohler, " New Concept in Clay Products Now a Reality" Brick & Clay Record, May, 1964, at 36– 39

*Primary Examiner*—Julius Frome
*Assistant Examiner*—John H. Miller
*Attorney*—Robert P. Auber, George P. Ziehmer, Leonard R. Kohan and Lawrence E. Sklar

[57] ABSTRACT

A method for producing strong low density articles suitable for use as disposable containers by mixing expanded vermiculite and a ceramic material in about equal proportions by weight with water, pressing to the desired shape, drying, coating with an engobe and a glaze and firing to mature the galze and ceramically bond the matrix material with the vermiculite. Suitable matrix materials are clays, talc, fledspar, flint and wollastonite. Optionally pressing lubricants can be used.

13 Claims, 5 Drawing Figures

METHOD OF MAKING GLAZED CERAMIC BONDED EXPANDED VERMICULITE ARTICLES

CROSS-REFERENCES TO RELATED APPLICATIONS

This application is a continuing application for a patent for an invention disclosed in our earlier filed application Ser. No. 706,741, filed Jan. 31, 1968, now abandoned, which in turn is a continuation-in-part of our application Ser. No. 578,064, filed Sept. 8, 1966, and now abandoned.

BACKGROUND OF THE INVENTION

This invention relates to a ceramic material of low density and high strength for molding into articles such as disposable containers and the method for making such articles.

For some time, the whiteware or ceramic industry has directed its efforts to making either quality ceramic tableware or low-cost ware that can be used for extended periods of time. Little or no effort has been directed to developing low-cost, disposable ceramic-like ware. This is principally due to the economics and techniques utilized in the manufacture of whiteware. Heretofore, the ceramic materials utilized were not suitable for fabricating into single-use, disposable articles such as containers. Generally, the methods by which they were processed into final articles were too costly to make single use of the article economically feasible.

With the increased usage of "one-way" glass, plastic, and metal containers, interest has increased in the utilization of quality-appearing disposable ceramic-type containers for the dispensing of food products. Such ceramic containers would impart a quality image to the product due to their "china-like" appearance. In addition to the appearance factor would be the obvious advantage of utilizing the container not only for the storing and/or freezing of the food products but also as a container in which the product may be heated and used for subsequent serving and consumption. Today, metal containers are largely used for this purpose. However, they generally have high-heat conductivity and thus do not retain heat well. Of course, such metal containers also do not have the high-quality appearance that is generally desirable for direct serving to consumers.

In addition to its obvious advantages in storage preparation and serving, another factor that is important in the use of disposable containers is the disposal problem itself. Neither metal, plastic, glass nor conventional ceramic containers are easily degraded or destroyed, so that they will not become a litter or trash problem. However, with the material developed in this invention, it has been found that the article may be easily ground up in conventional household garbage-disposal equipment and flushed away with the organic matter through many sewage systems.

Thus, this development provides a single-use, high-quality container which not only adds to the attractiveness of the food being served but also functions to hold the product during shipment and preparation, in addition to being degraded or destroyed by conventional and simple techniques.

It is, therefore, an object of the present invention to provide a low-density, high-strength ceramic material suitable for fabrication into low-cost articles which may have single-use utilization.

Another object of the present invention is to provide a method whereby the ceramic material, as set forth, is produced simply and economically.

Yet another object of the present invention is to provide a ceramic material and method, of the character described, for fabricating disposable heat-and-serve containers.

Still another object of the invention is to provide a disposable ceramic container which may be heated by any of the heating media commonly used in the preparation of food.

A further object of the present invention is to provide a ceramic material and method for producing disposable articles which are strong, lightweight, and resistant to thermal shock.

A yet further object of the present invention is to provide a ceramic composition which may be easily degraded after use to facilitate disposal by conventional techniques.

A still further object of the present invention is to provide a ceramic material and method, as set forth, suitable for producing containers which may be subjected to low temperatures for the purpose of retaining and storing frozen foods.

Numerous other objects and advantages of the present invention will become apparent from the following detailed description, which, taken in conjunction with the annexed drawings, discloses a preferred embodiment thereof.

SUMMARY OF THE INVENTION

The foregoing objects are achieved by intermixing proper proportions of clayey ceramic raw material, low-density siliceous aggregate in the form of vermiculite, and water, with or without suitable binders or deflocculants, etc. The resultant mixture is charged into a mold which is shaped to conform to the desired article that is to be produced thereby. The molding mixture may be compressed within the mold by, for example, a hydraulic press. After having been thus formed, the article is removed from the mold. To facilitate removal of the article from the surfaces of the mold, the surfaces may be coated with a release agent prior to the molding process. Alternatively, a release agent may be contained within the molding mixture for the purpose of simplifying the removal of the formed article from the mold. Subsequent to molding, but prior to being placed in a high-temperature burn-out oven, the compacted mixture is partially dried to remove a percentage of the water initially present in the molding mixture. The burn-out removes any remaining water from the compacted mixture as well as any organic materials, such as the internal release agent, that are present. Thereafter, the partially dried compacted mixture may be glazed and otherwise decorated with ceramic glazes which mature at the temperatures used in the firing kiln. After another drying step which removes most of the moisture introduced by the glazing or decorating process, the glazed, partially dried, compacted mixture is fired at elevated temperatures for the purpose of developing ceramic bonding and fusion of the particles, thereby forming the low-density ceramic article.

DETAILED DESCRIPTION

Figure 1:
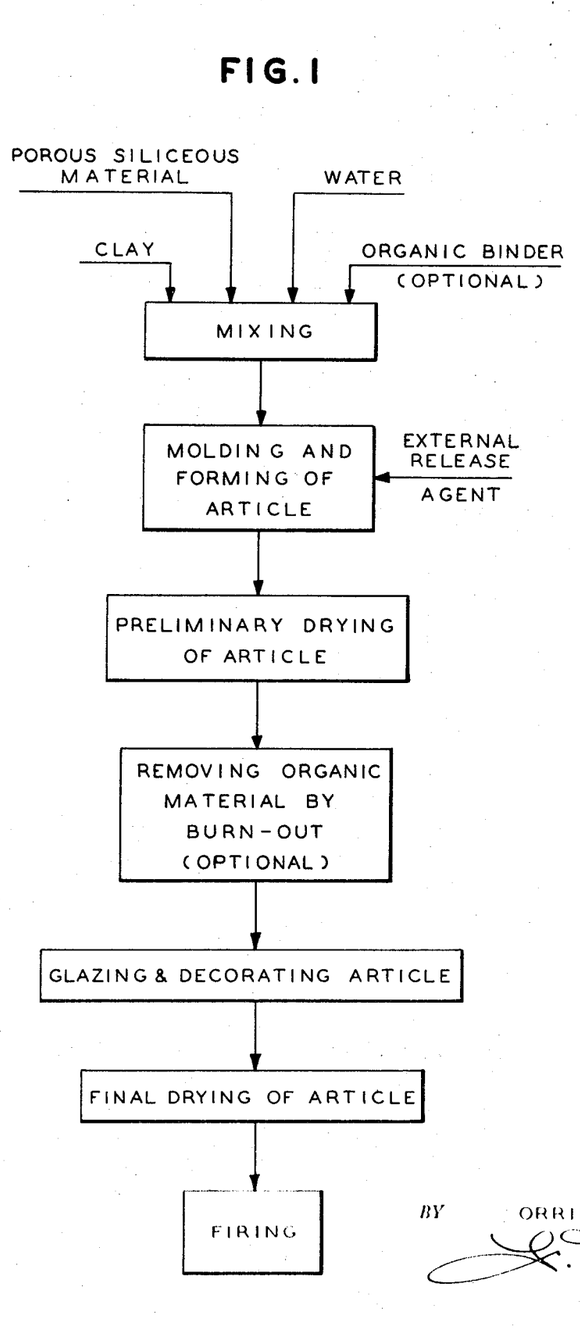
FIG. 1 is a process flow diagram showing, in detail, the steps whereby ceramic articles may be produced simply and economically.

As a preferred or exemplary embodiment of the instant invention, FIG. 1 illustrates a process flow sheet wherein the first step in the process for producing the article of the instant invention it to combine a mixture of clay, a porous or hygroscopic siliceous aggregate preferably in the form of vermiculite; and water in the proper proportions. The clay used for this process may be a mixture of true clays and other minerals which together produce a raw material that will ceramically bond at elevated temperatures. This ceramic raw material mixture may be prepared from ball clay and kaolin with inclusion of other ingredients frequently found in ceramic mixtures, such as talc, flint, feldspar, wollastonite, and bentonite clay. As demonstrated in the examples hereinbelow, one or more of these ingredients may be omitted from the ceramic raw material without affecting undesirably or even materially the fired properties of the resulting aggregate, but at least about one-half by weight of the ceramic raw material should be made up of a clay or clays. The preferred combination usually includes ball clay. Upon being fired, the clay will generally fuse to some degree with particles of the aggregate.

Vermiculite is the preferred low-density, porous siliceous aggregate used. It is preferable that the aggregate be in its lowest density condition, which, for vermiculite, would be in the expanded form.

One particle size of vermiculite that may be mixed with the clay is number 4, commonly known as agricultural grade vermiculite. As indicated, this vermiculite is supplied in the expanded form, obtained conventionally by heating to a temperature approaching 2000° F. Of course, other sizes of vermiculite may also be used. The natural size distribution of particles in grade No. 4 ranges from plus 10 mesh to minus 60 mesh. During the mixing operation, the particle size may be significantly reduced. The ideal distribution of No. 4 grade particles is as follows: Plus 20 mesh, 13 to 17 percent; minus 20 to plus 40 mesh, 45 to 50 percent; minus 40 to plus 60 mesh, 25 to 30 percent; and, minus 60 mesh, less than 20 percent.

Fired bodies can be made from mixtures with vermiculite-to-clay weight ratios from an extreme of 95 percent vermiculite and 5 percent clay to about 30 percent vermiculite and 70 percent clay. The invention comprehends the use of particulate molding mixtures in which the solids consist essentially of the clayey ceramic raw material and the expanded vermiculite with neither component greatly preponderating in weight proportion, as indicated by the 70 percent clay-30 percent vermiculite mixture. Preferably the ceramic raw material and vermiculite are present in approximately equal proportions by weight, as illustrated by mixtures containing 55 percent clayey ceramic raw material and 45 percent expanded vermiculite by weight, corresponding to approximately 22 volume percent clayey material and 78 volume percent vermiculite. Several examples illustrating compositions of clayey ceramic raw materials, as well as of clay and vermiculite mixtures, are as follows:

EXAMPLE 1

| Clay Mixture | % by Weight |
| --- | --- |
| Gleason ball clay | 30 |
| Georgia Kaolin | 15 |
| Talc (New York) | 25 |
| Flint (potter's) | 15 |
| Feldspar (Kona F–4) | 9 |
| Wollastonite | 4 |
| Bentonite | 2 |
| Total | 100 |

EXAMPLE 2

| Clay Mixture | % by Weight |
| --- | --- |
| Gleason ball clay | 40 |
| Georgia kaolin | 25 |
| Talc | 25 |
| Wollastonite | 8 |
| Bentonite | 2 |
| Total | 100 |

EXAMPLE 3

| Clay-Vermiculite Mixture | Parts by Weight |
| --- | --- |
| Clay mixture in Example 1 | 50 |
| No. 4 grade vermiculite | 50 |
| Water | 54 |
| CMC7MP (Medium viscosity cellulose gum) Dry weight, supplied dissolved in the water | 0.0625 |
| Paraffin oil | 1.54 |
| Solids content of the clay-vermiculite mixture, 65% | |

Articles molded from the mixture of Example 3, at 100 pounds per square inch forming pressure and fired for 20 minutes to 1950° F., have a modulus of rupture of approximately 524 pounds per square inch, and a density of 0.83 grams per cubic centimeter.

EXAMPLE 4

| Clay-Vermiculite Mixture | Parts by Weight |
| --- | --- |
| Clay mixture in Example 2 | 50 |
| No. 4 grade vermiculite | 50 |
| Water | 54 |
| CMC7MP (medium viscosity cellulose gum) | 0.0625 |
| Solids content, 65% | |

Articles molded, from the mixture of Example 4, at 100 pounds per square inch forming pressure and fired for 20 minutes to 1950° F., have a modulus of rupture of approximately 557 pounds per square inch, and a density of 0.82 grams per cubic centimeter.

The following examples show variations in composition wherein Example 5 has high solids, Example 6 contains no binder.

EXAMPLE 5

| | Parts by Weight |
| --- | --- |
| Clay body shown in Example 2 | 50 |
| No. 4 grade vermiculite | 50 |
| Water | 18 |
| CMC7MP | 0.0625 |
| Paraffin Oil | 1.54 |
| Solids content of the aqueous mixture, 84.8% | |

EXAMPLE 6

| | Parts by Weight |
|---|---|
| Clay body shown in Example 2 | 50 |
| No. 4 grade vermiculite | 50 |
| Water | 54 |
| Paraffin oil | 1.54 |
| Solids content, 65% | |

The ball clay used in these examples is a standardized product originating at Gleason, Tenn., available commercially as Gleason Clay (H.C. Spinks Clay Company, Inc., Paris, Tenn.).

Its analysis, long available in the widely distributed publication "Spinks Clay Data Book" of H.C. Spinks Clay Company, is in Table I, expressed conventionally in percent by weight of oxide equivalents:

TABLE I

| | |
|---|---|
| $SiO_2$ | 57.8 |
| $Al_2O_3$ | 27.2 |
| $TiO_2$ | 1.5 |
| $Fe_2O_3$ | 1.4 |
| $K_2O$ | 0.1 |
| CaO | 0.1 |
| Other oxides | 0.2 |
| Loss on Ignition | 11.7 |
| Total | 100.0 |

The Georgia kaolin used is the common kaolin mineral, $Al_2O_3.2SiO_2.2H_2O$, containing in closely equivalent molar proportions the indicated components of this relatively pure clay mineral, and containing also small amounts of impurities commonly encountered in such commercial kaolin of good quality, namely about 1½percent $TiO_2$, about ½% $Fe_2O_3$, and lesser total amounts of other trace impurities; reference: F.H. Norton, "Refractories," McGraw-Hill Book Company (1949), p. 39 (available as Ajax 70 kaolin, Georgia Kaolin Co., Elizabeth, N.J.).

The New York State talc used is the common native hydrous magnesium tetrasilicate, $Mg_3Si_4O_{10}(OH)_2$, which may be expressed as the monohydrate $3MgO.4SiO_2.H_2O$, 90 percent of which is made up of the indicated components of this mineral in closely equivalent molar proportions, and which contains also commonly encountered impurities, namely about 8.0 percent CaO, about 0.6% $Al_2O_3$, and the balance mostly $Fe_2O_3$, MnO, and $Na_2O$ in about equal amounts (available as Nytal 99, R.T. Vanderbilt and Co., New York).

The potter's flint used is the high quality product of commerce analyzing as high as 99.8 percent quartz $SiO_2$.

Feldspars are geological precursors of clays and are used extensively as ceramic raw materials. The feldspar used is of the common type $Na_2O.Al_2O_3.6SiO_2$ containing potash and lime as commonly encountered, portions of each mole of $Na_2O$ being replaced by equivalent amounts of $K_2O$ and CaO which in the Kona feldspar are present in molar proportions of $Na_2O:K_2O:CaO$ closely approximating respectively the proportions 11:5:3. This mineral of excellent purity is native to Kona, N.C., and is available commercially as New Kona F-4 Feldspar, 200 mesh (International Minerals and Chemical Corp., Skokie, Ill.).

The wollastonite used is the natural calcium silicate mineral, $CaSiO_3$, of commerce, containing about 3 percent of commonly encountered impurities, principally $SiO_2$ (in excess of the amount equivalent to the CaO present, less than 1 percent) and substantially smaller amounts each of FeO, $Al_2O_3$, and several trace impurities (available as Cab-O-Lite (wallastonite) Cabot Corp., Boston).

The bentonite which is used in small proportions is a clay mineral of the usual high (90 percent) montmorillonite content containing also fragments of other minerals, notably feldspar. The over-all analysis of this typical bentonite corresponds closely to a classic form of montmorillonite, having aluminum tetrasilicate monohydrate and magnesium tetrasilicate monohydrate in a 6:1 molar ratio, i.e., $6Al_2Si_4O_{10}(OH)_2 \cdot Mg_3Si_4O_{10}(OH)_2$, and containing soda, lime, and some iron as commonly encountered, each $Al_2O_3$ component including substituted $Fe_2O_3$ equivalents in a molar ratio of 10:1, and each MgO component including substituted $Na_2O$ and CaO equivalents in respective molar ratios of 6:3:1 (available as Volclay bentonite, American Colloid Co., Skokie, Ill.).

The specified binder, CMC-7MP cellulose gum, is a commonly available purified grade of Sodium Carboxy-Methyl-Cellulose Hercules Co.), having an average of 0.7 carboxymethyl groups on each glucose unit of the cellulose structure (out of the maximum of three groups which may be substituted on each glucose unit), having a viscosity in the Medium range (300 to 600 centipoises in a 2 percent aqueous test solution), and refined to the Pure form (over 99.5 percent purity) suitable for food use.

The water content of the molding mixture is critical because it influences the strength and density of the product and also affects the resistance of the product to cracking when exposed or subjected to rapid high-temperature drying. Water content may be varied within the range of 10 to 100 percent of the weight of the clay-vermiculite solids in the mixtures. Expressed another way, such clay-vermiculite mixtures with water would contain respectively about 90 to 50 percent solids. However, it is recommended that the water content be low enough to give mixtures containing at least about 65 percent solids, and a preferred range for mixtures relatively high in solids is about 80 percent to about 85 percent solids. When the amount of moisture is excessive, the mixture tends to stick to the surfaces of the mold within which it is compacted into the shape of the article or product to be formed. If, on the other hand, the amount of moisture used is deficient, much higher forming pressures are required during the molding process.

It is not essential that a binder be added to the molding mixture. This is especially true when a high percentage of solids is used, such as above 70 percent. However, a binder provides increased wet strength to the molded articles facilitating handling during subsequent operations. Binder may also increase the strength of the fired ware. Higher concentrations of binders, however, do not result in corresponding increases in strength. When binders are present in excessive amounts, they may cause severe sticking of the compacted mixture to the surfaces of the mold. Glaze receptiveness also deteriorates with high concentration of binders.

The binder may be selected from a class of compounds such as starch, dextrin, cellulose gums or synthetic organic water soluble polymers such as polyvinyl alcohol, and polyvinylpyrrolidone.

Binder may be added at a concentration of up to four percent of the weight of the dry ingredients and may be added either as a dry powder or in a solution of the water used in the mixture. The preferred binder is a solution of a medium viscosity cellulose gum, illustrated by the CMC-7MP product identified herein above, added at a dry weight concentration of about 0.0625 percent of the weight of the dry clay-vermiculite ingredients.

In order to aid in stripping the molded compacted mixture from the surfaces of the mold, release agents or internal lubricants may be introduced into the mixture of materials. However, such release agents or internal lubricants decrease the wet strength of the compacted mixture. Release agents may also be applied directly to the surfaces of the mold. When release agents are added to the molding mixture, they may include hydrophobic materials of the class of light oils. External release agents applied directly to the surfaces of the mold, on the other hand, may contain hydrophobic film-forming materials of the class of stearic acid or metal chelate compounds of stearates. These materials are dissolved in low-boiling-point solvents such as n-heptane or n-hexane.

One internal-external release-agent system that may be used, if desired, is a combination of paraffin oil, for internal release, which is added to the molding mixture at 1 percent of the total weight thereof, and an external release coating of stearic acid applied to the mold surfaces as a solution in n-hexane, or n-heptane. Since release agents may be added to the molding mixture as well as applied to the surfaces of the mold, it is referred to as internal agent when added to the mixture, and external agent when applied directly to the mold.

The molding mixture containing clay, vermiculite, water, organic binder and any internal release agent may be mixed in any one of a number of suitable mixing apparatuses. The P-K liquid-solids blender, Abbe ribbon mixer, and the Hobart paddle mixer are examples of mixers which provide proper distribution of the particles throughout the aggregate.

It has been found that the usual procedure of mixing the solids together and then adding water frequently results in a non-uniform lumpy mix, particularly when the ratio of clay to aggregate is high, as in the preferred compositions. To obviate this problem, water is first added to the aggregate so that it is partially absorbed by the aggregate. Thereafter, the clay is mixed in, thus minimizing the formation of lumps.

It has been found that the bulk density (including voids) of the molding mixture increases with mixing time. This is probably due to fracturing of the aggregate into smaller pieces with release of some entrapped air. Therefore, when the desired mixture density is obtained, mixing is discontinued. This insures a more uniform material for molding.

For No. 4 grade vermiculite, a batch-to-batch molding mixture density of approximately from 520 to 580 g/L, with 550 g/L preferred, has been adequate without requiring changes in 1 the compacting, drying, and firing conditions. The density measurement is made after suitable agitation to eliminate air pockets within the mixture. When thin wall articles are to be made, a finer grade of aggregate, such as No. 5 vermiculite made up of particles which pass the 40 mesh screen, is frequently desired. This gives a compacted mixture of greater moldability than obtained with No. 4 grade vermiculite and produces greater wet strength in the compacted mixture to make subsequent handling easier.

Figure 2:
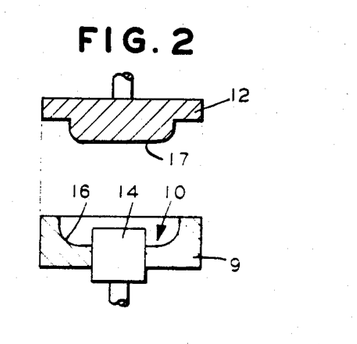
FIGS. 2–5 are functional schematic diagrams showing the procedure whereby a mixture containing ingredients for producing a ceramic material is molded into the desired shape and article.

For the purpose of forming a dish-shaped article, initially as a green ceramic dish, FIGS. 2-5 illustrate a mold, generally designated 9, having a female cavity 10 and a male ram 12. As shown in FIG. 2, there is included a knockout plate 14 which serves to eject the article from the mold 9 after the green article has been formed. Prior to charging the mold 9 with a molding mixture 15, the surfaces 16, 17 of the mold 9 are coated with an external release agent, and the knockout plate 14 is located midway between the ejection position and the retracted position. External release agents may be applied to the surfaces of the mold prior to each molding cycle.

Figure 3:
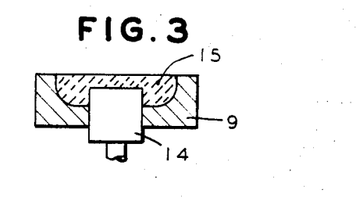

The mold 9 is then charged with a molding mixture 15 as shown in FIG. 3. The positioning of the knockout plate 14, in substantially its midpoint position prior to the charging of the mold 9, achieves the desired placement of the material within the mold 9 so that good compaction results in the wall areas.

Figure 4:
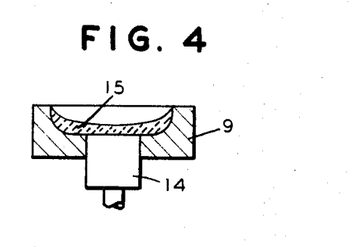
Figure 5:
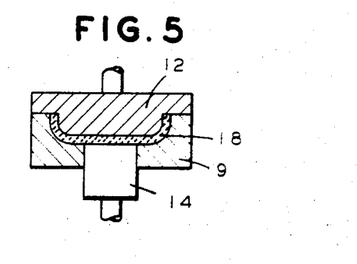

After the proper amount of charge has been introduced into the mold 9, the knockout plate 14 is retracted or withdrawn from the mold cavity 10 as shown in FIG. 4. The male ram 12 is then actuated so as to develop the desired pressure and force the molding mixture 15 to be compacted to the shape of the closed mold cavity defined by the ram 12 and the female mold 9 (FIG. 5). After a compacted mixture 18, in the shape of a green dish, has been thus formed, the male ram 12 is slowly released and the knockout plate 14 is actuated to eject the compacted mixture 18 from the mold 9. When the compacted mixture 18 is removed from the mold 9 at this stage of the process, it is in a substantially fragile condition as it is in a "green" or unfired state.

The surfaces of the mold are generally of polished steel and are maintained to assure that they do not contain any scratches or similar defects. Such scratches operate so that the mold exhibits poor release characteristics.

The characteristics of the molded compacted mixture are dependent on numerous factors including the molding pressure, article geometry, water content of the mixture, clay-to-aggregate ratio, uniform particle-size distribution, release agent, type of binder, concentration of binder, and method of adding the binder.

The pressure used during molding may be varied, depending in part upon how long the pressure is applied. If the pressure is applied for several seconds, pressures in the range of 50-300 psi may be used. For high-speed operation where the pressure is applied for only a fraction of a second, pressures ranging between 250 and 850 psi are preferred. At low pressures, a poorly compacted mixture is obtained, while, at high pressures, adherence of the mixture to the mold surfaces becomes a problem. A hydraulic press, toggle press, screw press, or other suitable means for generating pressure may be used for applying the necessary forming pressure to the mold.

The compacted mixture, after removal from the mold, must have its moisture reduced, i.e. be partially dried, before entering a burn-out zone or kiln, which removes organic material present within the compacted mixture. The partial drying step may be accomplished by exposing the compacted mixture to radiant energy which is provided by suitable infrared generators, or by placing the compacted mixture in a circulating-air oven operating at elevated temperatures. The important aspect of this drying step resides in the removal of substantially 10 to 20 percent of the water initially present prior to placing the compacted mixture in the burn-out kiln for optimum burn-out time. Compacted mixtures placed in the burn-out kiln with less than 10 to 20 percent of the initial water removed may crack, blow out large pieces of material from the surfaces, or warp excessively. The drying is performed in the preferred manner when more than 20 percent of the water is removed.

Based upon experimental results with the compacted mixture 18, the partial or preliminary drying process may be accomplished by any one of the following methods. Each process does not result in the same degree of drying, although each is satisfactory. Other times and temperatures may be used, depending upon the equipment employed and the configuration of the article to be produced.

a. 6-minutes exposure to infrared electric bulbs.
  b. 4 minutes at 400° F. in an air oven.
  c. 6 minutes at 350° F. in an air oven.
  d. 8 minutes at 300° F. in an air oven.
  e. 10 minutes at 250° F. in an air oven.

After the compacted mixture has been preliminarily dried, as disclosed hereinbefore, it may be placed in a kiln or moved to a hotter oven zone for the purpose of removing the remaining water as well as organic materials contained within the body of the compacted mixture. The operating temperature of the kiln may be within the range of 600° F. to 1,500° F, and the compacted mixture may be subjected to this temperature from 3 to 10 minutes. A preferred burn-out cycle lasts 3 minutes, corresponding to a kiln operating temperature of 1,300° F. The process conveniently is designated as "burn-out" because its purpose is not only to complete the drying but also to burn out any organic materials present within the compacted mixture. When no internal organic lubricant or release agent is present, "burn-out" may be carried out at somewhat lower temperatures.

Subsequent to "burn-out," the dried compacted mixture is coated with engobe. Engobe is a mixture of fine clay and water, well-known to those skilled in the art, applied to earthenware often as a support for glaze or enamel. Ball clays are identified and defined in the literature as fine grained relatively pure hydrated aluminum silicate, and hence are eminently suitable as fine clays for use in the engobe mixture. For the instant usage, the engobe provides a barrier to reduce the permeability of the dried compacted mixture's porous surface prior to glazing, thus effectively preventing any reaction of the glaze material with the green ceramic body material. In the present usage, the engobe ordinarily is applied by spraying, and the fine clay, conveniently the ball clay used in the green ceramic mixture, is suspended in an approximately equal weight of water, e.g., with a solids concentration of from about 55 to 60 percent by weight. It will be appreciated that up to about 1 percent of a conventional dispersant solution may be included advantageously in the engobe mixture to minimize problems due to settling of the fine clay solids. Because the weight of the thin engobe coat is small, little water from the engobe spray penetrates the dried compacted mixture. However, any water in the dried compacted mixture will vaporized through the glaze, along with the water from the glaze formulation, during pre-heating for subsequent final firing.

With the removal of the moisture and organic materials, the dried compacted mixture may be glazed or otherwise decorated with ceramic glazes. The base coat of engobe is applied prior to glazing. The requirements for a satisfactory glaze include proper fit to the article, low cost, and the condition that it mature at temperatures used in the firing process. It is generally desirable to provide for a short pre-heating or drying period at the termination of the glazing process. The purpose of such drying is to remove moisture introduced during the application of glaze and/or decoration.

After the glazed compacted mixture has been thus dried, it may be fired at elevated temperatures for the purpose of developing ceramic bonding with incipient fusion of the particles within the materials of the compacted mixture and maturing of the glaze to produce a low-density ceramic article.

Firing cycles as short as 5 minutes (and preferably at least 20 minutes including time in heating-up and cooling zones) and as long as 45 minutes have been satisfactory at temperatures ranging from 1,800° F. to 2,100° F. A preferred firing cycle lasts approximately 20 minutes while the glazed compacted mixture is transported through a kiln having three temperature zones.

The first zone of the kiln functions as a pre-heat zone and operates within the range of 900° F. to 1,300° F. The second zone is a soaking zone operating within the range of 1899° F. to 2100° F. The last zone serves as a cooling zone in which the article experiences a gradual decrease in temperature as it passes through.

The cooling zone operates at a temperature of 1900° F. adjacent to the soaking zone, and at 300° F. where the article exits from the firing kiln. The temperature of the article is thus gradually reduced in the cooling zone from the temperatures to which it was subjected in the soaking zone. Although the article may emerge into the ambient air at temperatures as high as 900° F. without cracking due to thermal shock, a more gradual cooling process is preferred.

After being fired, a glaze having a thickness of 9 to 12 mils exhibits adequate resistance to the cutting stroke of a knife, although a thicker glaze of course may be provided.

When clay-vermiculite bodies of the indicated compositions are formed, dried, and provided with engobe coatings, as described hereinabove, the selection of a variety of glaze compositions for application to such bodies, readily producing useful glazed products upon firing, requires a minimum of experimentation and presents no problem to the skilled ceramist. Glaze compositions chosen with reasonable care to obtain suitable fit and maturing temperature, as suggested hereinabove, have been unexpectedly successful in producing glazed articles of desirable characteristics, especially in view of the unconventional nature of the green bodies. Following known precepts for obtaining proper fit, the thermal expansion coefficient of the matured glaze should be somewhat less than that of the fired body, thus providing adequate thermal shock resistance.

Illustrating the latitude of choice of glaze compositions which may be used on green bodies formed in accordance with the examples herein, early tests embodying the process and articles of the present invention successfully utilized hobbyist's glazes purchased from the shelves of a neighborhood ceramics shop. One of these conventionally useful glaze compositions operative in accordance with the invention has the analysis shown in Table II. This composition has a lead content which makes it inadvisable for glazing articles intended for use with foods, but provides attractive, longlasting, and inexpensive disposable receptacles or containers of various shapes which resist heat, soiling, and most chemical attack and are suitable for many non-food uses.

TABLE II

| | |
|---|---|
| $SiO_2$ | 36.5 |
| PbO | 29 |
| $ZrO_2$ | 14.5 |
| $B_2O_3$ | 12 |
| $Al_2O_3$ | 3.5 |
| CaO | 2.5 |
| $Na_2O$ | 2 |
| Total | 100 |

With respect to glaze compositions, and particularly with respect to the clay and other components of the ceramic raw material utilized in these fired bodies, it should be noted that minor variations in composition are seldom critical. Thus, changes in the amount or nature of ingredients introduced secondarily as mineral impurities, and even extensive variations of oxide or other components present in trace amounts, will not impair or affect materially the operativeness of the formulations given as examples and embodiments of the present invention, and covered broadly in the claims appended hereto.

The drying and firing times suggested hereinabove are 4 to 10 minutes for preliminary drying after molding followed by 3 to 10 minutes for burn-out, then, after glaze application, a short period for oven preheating or final drying followed by 20 to 45 minutes in the firing kiln. Allowing conservatively between 3 and 15 minutes for the final oven pre-heating, the several drying and firing operations consume a minimum of about 30 minutes or a maximum of about 80 minutes.

As further examples of molding mixtures high in solids (i.e., with between about 80 percent and about 85 percent solids content by weight) and without binders, the following compositions, among most of those used, have proved to have preferable characteristics:

EXAMPLE 7

| | Parts by Weight | 100 Parts Solids Basis |
|---|---|---|
| Gleason ball clay | 84 | 55 |
| No. 4 vermiculite | 69 | 45 |
| Water | 33 | 21.5 |
| Solids content, 82.3% | | |

EXAMPLE 8

| | Parts by Weight | 100 Parts Solids Basis |
|---|---|---|
| Gleason ball clay | 28 | 55 |
| No. 5 vermiculite | 23 | 45 |
| Water | 13 | 25.5 |
| Solids content, 79.7% | | |

It appears that these molding mixtures consist essentially of water, and of clay and expanded vermiculite solids in approximately equal proportions by weight. Good results also have been obtained, when using mixtures of the 55 parts clay–45 parts vermiculite type, upon replacing about 20 percent of the ball clay with the same weight of New York talc, using for example a clayey ceramic raw material made up of 44 parts ball clay and 11 parts talc, which resembles the mixture of clays and talc (with some wollastonite) of Example 2.

Referring to the composition given in Example 7, the molding mixture is formed by weighing out the expanded vermiculite particles into a ribbon type mixer, and then, as recommended hereinabove, adding the required amount of water to the vermiculite preferably as a coarse spray. Mixing is continued for 1 minute after the measured amount of water has been added. The mixer is stopped, all of the clay particles are added, and mixing then is resumed and continued for the length of time needed to obtain the proper bulk density, usually 8 to 15 minutes. More intimate mixing is not required for good results, and this ease and rapidity of achieving satisfactory mixing is highly advantageous.

Referring also to Example 8, this composition is amenable (using suitable muller-type equipment) to more intimate mixing giving higher bulk densities, so that it is possible to produce a substantially denser fired body than is obtained readily with the composition of Example 7 using No. 4 grade vermiculite. However, the composition of Example 8 likewise preferably is mixed in a ribbon mixer in the same manner and to the same degree as with the composition of Example 7, with closely similar results. In Example 8 water is provided for the complete mixture in such amount that the clay and vermiculite solids constitute about 80 percent by weight of the mixture.

Referring now to the individual mixtures prepared similarly, as just described, in accordance with both Example 7 and Example 8, the further procedures used to produce glazed articles from these mixtures likewise are quite similar. In both cases, molding to form a green dish is carried out as described hereinabove with reference to FIGS. 2–5. Referring to these figures of the drawing, mold dimensions are used in one embodiment of the invention to form a round dish 6 inches in diameter and having an average thickness of about 0.2 inch. The shape and proportions of the dish are indicated generally in FIG. 5. It will be appreciated, of course, that the mold conveniently may incorporate any of numerous minor variations in the shape of the dish, such as a flare at the edge of the rim or a circular shallow bead protruding below the flat base of the dish to provide a supporting ridge during eventual use; a dish of a generally square shape in plan view, with broadly rounded contours, also may be molded with equal ease. To form the clay-vermiculite mixture into a circular dish of the above-mentioned size and shape, with or without such minor variations in shape, requires a pressing force in the mold of at least about 3,000 pounds, this being the approximate minimum force which provides a pressure within the mold adequate to form a green ceramic dish having sufficient wet strength to retain its shape and integrity during removal from the mold and transport to the drying ovens. A predetermined sufficient amount of the mixture is charged into the mold so that, after molding, the volume of the mixture has been decreased from about 3 or 4 volumes to 1 volume. A decrease in volume closely approximating 3.5 to 1 advantageously is effected. The true molding pressure ordinarily is within the range of 50–300 pounds per square inch discussed hereinabove, usually requiring an average pressure of at least 100 psi but not over 300 psi, and preferably the average pressure within the mold is between about 120 and 275 psi. The pressure effectively exerted may be determined primarily by the volume of the mixture originally charged into the mold, since, as suggested by the diagrammatic illustrations of FIGS. 2–5, the ram 12 conveniently is pressed into the mold cavity with a force somewhat exceeding that needed to cause the flanged periphery of the ram to seat firmly on the upper edge surface of the mold, whereupon further force is exerted on the mold structure rather than on its contents. Dishes of larger sizes and more complex shapes may be molded rapidly with correspondingly low pressing forces.

The molding equipment is designed, using conventional production techniques, with number of dish-shaped mold cavities in a movable non-porous die arrangement, not illustrated, whereby the non-porous molds are treated in one position with the external release agent and charged with the measured amount of clay-vermiculite mixture, then are positioned for the stroke of the molding ram, and finally are ejected onto a flexible link chain belt. This equipment readily performs 10 to 12 complete molding cycles per minute. The continuous chain belt then carries the bodies directly into and through the oven for drying and burn-out, so that with most belt transport arrangements less than a minute passes between charging of a mold and entry of the newly molded green body into the oven. Thus, bodies of complex shapes can be pressed rapidly at low pressures from the mixtures of vermiculite and clayey ceramic raw materials, and then stripped automatically from the molds without using porous mold parts, forming pieces strong enough to be handled automatically directly upon ejection from the mold with no hand finishing required.

The external release agent thus is applied as needed to maintain a film of suitable tenacity on the mold cavity surfaces. There has been used for such purpose in this equipment about 2 to 6 weight percent of stearic acid, as mentioned hereinabove, in an alkane hydrocarbon organic solvent, which may be hexane, heptane, or mixtures thereof or with kerosine or mineral spirits —in this example, about 5.5 parts by eight of stearic acid in 86 parts of heptane and 8.5 parts of kerosine.

Following actuation of the ram 12 to mold the green dish, and subsequent actuation of the knockout plate 14 to eject the green dish from the mold 9, the dish is transported into an 18-foot long hot-air oven having a continuous, 36-inch wide metal mesh belt. The belt has a variable speed drive for regulating treatment times, and the oven conveniently provides two treatment zones, thus combining in one piece of equipment both the preliminary drying function and the "burn-out" function discussed hereinabove. A total treatment time of 15 minutes within this oven is sufficient, 7½ minutes in each zone. With this continuous treatment the preliminary drying zone can be heated successfully to somewhat over 400° F., preferably to 450° F., after which a rather moderate temperature of 750° F. in the burn-out zone achieves removal of practically all of the remaining water without adverse affect on the molded body.

An engobe is applied to the dried green dish by spraying the engobe dispersion on the dish while supported so as to be rotated and transported past the spray nozzles. The engobe used is a dispersion of 55 parts by weight of the Gleason ballclay in 45 parts of water which also contains 0.4 part of an aqueous sodium silicate solution, supplying 0.15 part of the solid dispersant to the engobe dispersion. The engobe advantageously is applied to all surfaces of the dish, including any surfaces which are not glazed, since the engobe makes the fired body appear white instead of s brown where unglazed. A sufficient amount of engobe is applied to provide an engobe layer having an average thickness of about 0.008 inch.

The body now moves to the spraying equipment for application of the glaze material to at least most of the engobe-covered surfaces of the dish. Ordinarily the glaze is applied to the interior surface of the dish but not to the lower or bottom surface. The composition of the glaze dispersion used is given in Table III, along with the composition of a similar glaze appearing in published paper. The glaze as used in Examples 7 and 8 differs from the published glaze principally in the substitution of calcium carbonate for barium carbonate, which might provide an extractable substance of possible toxicity. The frit of the composition included in Table III may be procured on the market, ready for mixing with the other components of the glaze composition and for addition of the water medium including dissolved dispersant.

TABLE III

| Ingredients | Published Glaze | Glaze As Used |
|---|---|---|
| Feldspar (Kona, North Carolina) | 28.4 | 30.4 |
| Alkaline borosilicate frit (below) | 19.5 | 20.8 |
| Wollastonite | 14.3 | 10.0 |
| Kaolin (Georgia) | 8.9 | 9.6 |
| Potter's flint | 8.7 | 9.4 |
| Barium carbonate | 1.0 | |
| Calcium carbonate | | 1.08 |
| Zinc oxide | 9.6 | 10.3 |
| Zirconium silicate opacifier | 9.6 | 8.2 |
| Cellulose gum dispersant (CMC-7MP) | | 0.22 |
| Total | 100.0 | 100.0 |
| Water | (Made up to specific gravity 1.86) | 50.0 |

Frit (Alkaline Borosilicate Type)

| | |
|---|---|
| CaO | 17.0 |
| $B_2O_3$ | 18.7 |
| $Na_2O$ | 8.5 |
| $Al_2O_3$ | 5.0 |
| $K_2O$ | 0.3 |
| $SiO_2$ | 50.0 |
| Others | 0.5 |
| Total | 100.00 |

The published glaze and frit compositions appear in a paper by W.H. Orth, Am. Ceramic Soc. Bull., vol. 46, pp. 841–844 (Sept., 1967), and these compositions also appeared in the paper as it was prepublished for presentation at a symposium in Apr., 1964.

A sufficient amount of glaze composition is applied to provide an average glaze thickness of about 0.020 inch.

Standard commercial spray lines, having spray guns carrying the nozzles for applying the water-dispersed solid compositions (available from Binks Manufacturing Company), are utilized for both engobe and glaze treatments. Two similar spray booths are arranged in tandem for the two treatments, with provision if desired for some drying between the two booths. A continuous flexible link khain runs through the two booths in tandem; this chain chain equipped at intervals with rotatable holders of conventional design, each of which supports a green body at several small points on its bottom surface, drive mechanisms being engaged to rotate the holders while positioned under each spray nozzle. Each green body spends a total of less than 4 minutes in the two spray booths; including waiting periods at transport belt transfer positions, the average time for passage from the burn-out oven through the engobe and glaze treatments and into the oven for final drying is no more than 6 to 8 minutes.

For the final drying or pre-heating, preparatory to firing, the article is transported through a hot-air oven, quite similar to the oven used for drying the freshly molded bodies and likewise having a continuous metal mesh belt with variable speed drive. The pre-heating time used for drying prior to ceramic-firing is 15 minutes with temperatures maintained at 300° F. at the entrance and rising to 35.° F. at the exit, whence the article is moved into the firing kiln.

A roller hearth kiln 40 feet long and 30 inches wide serves well for the firing step. The kiln is fired to establish successive pre-heating, soaking, and cooling zones. A typical firing schedule for the bodies made as described above in accordance with Examples 7 and 8 appears in Table IV. The ware naturally also requires about 5 or 10 minutes after leaving the kiln for further transportation and for cooling sufficiently to be packed or otherwise handled.

TABLE IV

| Kiln Zone | Firing Schedule |
| --- | --- |
| Pre-heat, coming up from drying temperature | 7 minutes |
| Soak, at firing temperature | 8 minutes at 2100°F. |
| Cool, to near room temperature | 10 minutes |
| Total time in kiln | 25 minutes |

The specific times required for preliminary drying and burn-out after molding and also for oven-heating and final firing after application of glaze, as described hereinabove with reference to Examples 7 and 8, total 55 minutes. An additional allowance of a total of 30 minutes is ample for molding, for application of engobe and glaze sprays, and in any ordinary layouts of plant for transport between the molding, spraying, and oven-heating and firing equipments, including cooling after leaving the firing kiln. Thus glazed, light-weight ceramic articles of good quality actually are produced from the mixture of EXample 7 in a total elapsed times of no more than 1½ hours, which is a very short period of time compared with conventional methods using conventional materials, resulting in very substantial savings in costs.

The specific gravity of the fired bodies produced in accordance with Examples 7 and 8 is about 1.1 and about 1.2 respectively. This applies to the glaze-free portions only of the fired bodies. By contrast, a body fired at about the same temperature from ball clay ceramic raw material without any vermiculite or other low-density aggregate has a specific gravity of about 1.8.

The article produced by the process of the present invention is strong, lightweight, and resistant to thermal shock. Through proper glazing and/or decorating, these articles may be made attractive for use as a serving dish. Thus, the dish may be applied as a heat-and-serve container. The food contents in the dish may then be heated by any one of the numerous heating media commonly used in the preparation of food.

When molded in the form of a serving dish or tray, the thermal conductivity of the article is also significantly lower than that of a corresponding drawn or stamped aluminum tray. For example, the coefficient of thermal conductivity of aluminum is approximately 100 times greater than the resultant lightweight ceramic substance. This thermal property of the latter is especially useful in conjunction with serving trays. Since the ceramic material will retain heat longer than aluminum, it will thereby maintain any food within the tray warm for a longer period of time, the ceramic dish or tray does not incur any freezing damage if it is covered with aluminum foil prior to freezing. Therefore the ceramic tray may be frozen and stored with food preparatory to heating whenever required for usage.

The low-cost aspects of the materials making up the ceramic substance, as well as the process by which the ceramic is formed into usable articles, make the latter readily disposable and suitable for one-time use. This special feature of these ceramic articles makes them attractive for application wherein it is not practical to cleanse or recover the articles for purposes of reuse.

It is thought that the invention and many of its attendant advantages will be understood from the foregoing description and it will be apparent that various changes may be made in the form, construction, and arrangement of parts and that changes may be made in the steps of the method described and in their order of accomplishment without departing from the spirit and scope of the invention or sacrificing all of its material advantages, the form hereinbefore described being merely a preferred embodiment thereof.

What is claimed is:

making a ceramic article, comprising the steps of:

forming a mixture of solid particles of ceramic raw material and expanded vermiculite of approximately equal proportion by weight in water wherein the solid particles constitute between 50 and 90 percent by weight of the mixture, wherein the vermiculite has a particle size distribution at least as fine as: 13 – 17 percent, plus 20 mesh; 45 – 50 percent, minus 20 to plus 40 mesh; 25 – 30 percent, minus 40 to plus 60 mesh; and less than 20 percent, minus 60 mesh; and wherein said ceramic raw material is selected from the group consisting of ball clay, kaolin, bentonite, talc, feldspar, flint and wollastonite, charging said mixture into a mold cavity;

pressing the mixture until its volume is reduced to ¼ to ⅓ the volume prior to pressing;

removing said green ceramic article from the mold cavity;

drying said green ceramic article;

applying water dispersions of a clay engobe and subsequently a glaze composition to article;

firing said ceramic article to a temperature within the range of 1800 to 2100° F. to mature the glaze and ceramically bond the ceramic raw materials admixed with the vermiculite.

2. The method of claim 1, in which said mixture is formed of 55 parts of ceramic raw material particles and 45 parts of vermiculite by weight.

3. The method of claim 1, in which said mixture is formed with said solid particles constituting between about 65 percent and about 85 percent by weight of the mixture.

4. The method of claim 1, in which said mixture is formed with said solid particles constituting between about 80 percent and about 85 percent by weight of the mixture. about 5. The method of claim 1, in which said mixture to be charged into the mold consists essentially of water, and of clay and expanded vermiculite solids in approximately equal proportions by weight and constituting between about 80 percent and about 85 percent solids by weight of the mixture.

6. The method of claim 1, in which said mixture is formed by adding water to the vermiculite and subsequently mixing in the ceramic raw materials.

7. The method of claim 5 in which said mixture charged into the mold contains 55 parts of clay and 45 parts of vermiculite by weight.

8. The method of claim 1, in which the dish-shaped mold cavity has a non-porous surface, and in which a release agent is applied to said surface before the mixture is charged into the mold.

9. The method of claim 1, in which the release agent applied is stearic acid in an organic solvent.

10. The method of claim 1, in which the pressing force used to form the green article provides an average pressure in the range of 50 to 300 pounds per square inch in the mold.

11. The method of claim 1 wherein the glazed article is dried prior to firing.

12. The method of claim 11, in which the firing is carried out in a firing cycle no longer than about 45 minutes which provides maturing temperatures in the range of about 1800° to 2100° F.

13. The method of claim 1 comprising the additional steps of adding lubricant to said mixture and subsequently heating said green ceramic article to a temperature in the range of 600 to 1500° F. to complete the drying and to effect burnout of the lubricant.

* * * * *

UNITED STATES PATENT OFFICE
CERTIFICATE OF CORRECTION

Patent No. 3,689,611      Dated September 5, 1972

Inventor(s) Paul Wilson Hardy et al.

It is certified that error appears in the above-identified patent and that said Letters Patent are hereby corrected as shown below:

Column 16, after line 47, insert

-- 1. A method of --.

Signed and sealed this 6th day of March 1973.

(SEAL)
Attest:

EDWARD M. FLETCHER, JR.
Attesting Officer

ROBERT GOTTSCHALK
Commissioner of Patents